(12) United States Patent
Goldner et al.

(10) Patent No.: US 11,858,685 B2
(45) Date of Patent: Jan. 2, 2024

(54) RECYCLABLE SHIPPING CRATE

(71) Applicant: DELAWARE NATIONAL ART COMPANY, LLC., Clifton, NJ (US)

(72) Inventors: Justin Cary Goldner, South Orange, NJ (US); Michael Stephen Brand, Morristown, NJ (US)

(73) Assignee: DELAWARE NATIONAL ART COMPANY, LLC., Clifton, NJ (US)

( * ) Notice: Subject to any disclaimer, the term of this patent is extended or adjusted under 35 U.S.C. 154(b) by 0 days.

(21) Appl. No.: 18/095,805

(22) Filed: Jan. 11, 2023

(65) Prior Publication Data
US 2023/0141405 A1     May 11, 2023

Related U.S. Application Data

(63) Continuation of application No. PCT/US2022/039393, filed on Aug. 4, 2022.

(60) Provisional application No. 63/255,265, filed on Oct. 13, 2021.

(51) Int. Cl.
*B65D 19/38* (2006.01)
*B65D 19/20* (2006.01)

(52) U.S. Cl.
CPC ............ *B65D 19/20* (2013.01); *B65D 19/385* (2013.01); *B65D 2519/00562* (2013.01); *B65D 2519/00567* (2013.01); *B65D 2519/00711* (2013.01)

(58) Field of Classification Search
CPC .................. B65D 19/20; B65D 19/385; B65D 2519/00562; B65D 2519/00567; B65D 2519/00711; B65D 9/30; B65D 9/06; B65D 9/26; B65D 9/36

USPC ........................................................ 206/386
See application file for complete search history.

(56) References Cited

U.S. PATENT DOCUMENTS

| | | | |
|---|---|---|---|
| 820,417 | A | 5/1906 | Herr |
| 1,523,116 | A | 1/1925 | Goodwin |
| 1,997,344 | A | 4/1935 | Randall et al. |
| 2,066,337 | A | 1/1937 | Cunningham |
| 2,141,324 | A | 12/1938 | Weis |
| 2,709,020 | A | 5/1955 | Ladd |

(Continued)

FOREIGN PATENT DOCUMENTS

GB            945883       1/1964

OTHER PUBLICATIONS

International Search Report of the International Searching Authority and Written Opinion issued by the United States Patent Office for International Patent Application No. PCT/US2022/039393, dated Dec. 16, 2022.

*Primary Examiner* — Anthony D Stashick
*Assistant Examiner* — Lauren Kmet
(74) *Attorney, Agent, or Firm* — MYERS WOLIN, LLC

(57) ABSTRACT

A shipping crate is provided having multiple walls. In each wall, a first wall layer has sides and a first thickness and a second wall layer has sides extending past each of the sides of the first wall by the first thickness. The crate also has a back panel having a first back panel layer and at least a partial second back panel layer. The first back panel layer has sides and a thickness substantially similar to the first thickness and the second back panel layer extends past each of the sides of the first back panel layer by the first thickness. When assembled, the first wall layers of each of the walls combine to form a post and lintel assembly. The second wall layers of each of the plurality of walls combine to form a second post and lintel assembly distinct from the first post and lintel assembly.

16 Claims, 15 Drawing Sheets

(56) References Cited

U.S. PATENT DOCUMENTS 3,144,951 A     8/1964   Knabe
3,921,846 A    11/1975   Mellott et al.
5,279,436 A     1/1994   Elliott et al.

RECYCLABLE SHIPPING CRATE

CROSS-REFERENCE TO RELATED APPLICATION

This application is a continuation of International Patent Application No. PCT/US22/39393, filed Aug. 4, 2022, which claims the benefit of U.S. Provisional Application No. 63/255,265, filed on Oct. 13, 2021, the contents of which are incorporated by reference herein.

FIELD OF THE INVENTION

This disclosure relates to shipping crates, namely shipping crates formed from recyclable and biodegradable materials.

BACKGROUND

Thousands of custom-designed, hand-built, and professionally packed crates are produced each year to protect high end and fragile artworks in transit. Most of those shipping transactions are of a commercial nature, i.e., the property is changing ownership. Many of these shipments are therefore one-way.

Very often, due to storage constraints, the crate is unpacked and disposed of once it reaches its ultimate destination. Crates are difficult to reuse, since they are typically sized to the particular artwork to be shipped.

Traditional crates are built from plywood, heat treated lumber, synthetic adhesives, and metal fasteners (such as staples, nails and screws), with interior bracing from petroleum derived low density polyethylene (LDPE) or ester foams—all of which are non-recyclable and non-biodegradable. A major concern in the global art industry is the disproportionate amount of waste, and the carbon output it produces relative to the volume of this commodity that is circulated.

Multi-use crates are available custom designed for the property, with the same environmental material concerns, as they are generally the same crate structures, just with additional batten reinforcement, a painted exterior, interior insulation, and threaded bolt plate closures. These upgrades come at a price point that's extremely high for the majority of commercial fine art shipments. Further, while these crates may be reusable, many crates are still only used once because, as noted above, much art shipment is one way.

Multi-use cases made from alternative, longer lasting materials (such as rubbers and plastics) are available in prefabricated standard sizes, but with many limitations in their use, and an extremely high price point for the majority of commercial fine art shipments. Such multi-use cases are often considered environmentally friendly because they are designed to be reused and not discarded. However, crates are typically sized to match artwork to be shipped, and the ability to reuse crates is therefore limited to artwork within a limited size range.

Further, these cases may be reused by some consumers, but few people ship art frequently enough to justify the cost of such cases. Indeed, a lot of art shipment is one way, so the cases are stuck at a destination after use. Further, these materials merely exacerbate the environmental concerns raised by shipping crates if they are ultimately disposed of.

There are corrugated 'strongboxes' available on the market. They come in a greater variety of sizes, and are designed to be packed by the consumer, but still utilize petroleum-based plastics and foams inside, are inferior in structural integrity to a standard traditional crate. These strongboxes are typically used for lower value and small artworks for overnight courier service. The ability to use such strongboxes is limited, since they are typically not designed for shipping artwork using commercial airfreight transport.

Traditional crate designs cannot easily be implemented in recyclable and biodegradable materials, as the materials typically used do not have the same structural integrity as the wood typically used in traditional crates.

There is therefore a need for a custom designed traditional art crate for one-way shipping that is made primarily or entirely from recyclable materials available on the market. There is a further need for such a crate that can provide significant structural support and resistance to crushing so that it can be used as a crate for valuable contents.

SUMMARY

Embodiments of the crates described herein may be custom designed, hand-built and professionally packed crates constructed from solid ply board, and may be built without or with only limited use of petroleum-based foam and adhesives. Some embodiments may be assembled without or with only limited use of metal fasteners, and can often be curbside recycled at the end of its use.

An interlocking laminated structure offers substantial protection during any mode of international or domestic transit, like traditional wooden crates. The construction methods described herein use the density of the solid board material to counterbalance any force that would cause torque at the joints, for superior crush resistance.

Further, in crate designs utilizing overlapping components, tape may be used to seal the lid. A traditional lid applied after loading the box would require tape to be interrupted by various structural elements, including skid, cleat, and handle elements, making it difficult or impossible to create a watertight seal between the opening of the lid and the body of the crate. Alternatively, if those structural elements were added after sealing the crate, it would result in additional labor by a party packing the crate rather than a manufacturer, resulting in a less complete sellable crate product, and it could result in structural elements that must be forcefully removed prior to opening the crate upon delivery. Further, in some embodiments, structural components are stapled in place, which would be difficult or impossible after the crate is packed and sealed. Accordingly, the removable lid may feature hinged frame battens, offering front load capability without sacrificing the structural integrity of the crate or the ability to fasten handles and skids during assembly for safer handling while in transit.

The crate may be constructed from 100% recyclable materials and may contain no or limited petroleum-based polymer adhesives. In some embodiments, the sealing tape is reinforced with fiberglass thread which is screened out as part of the paper re-pulping process. In some embodiments, staples may be used to fix targeted components to the crate, such as skids or handles. These components are typically the only components in the crate that are not biodegradable.

In some embodiments, a shipping crate is provided comprising a plurality of walls, with each wall comprising at least two layers of rigid material.

In each wall, a first wall layer of the at least two layers has sides and a first thickness and a second wall layer of the at least two layers of each wall has sides extending past each of the sides of the corresponding first wall by the first thickness.

The crate also has a back panel comprising a first back panel layer of the rigid material and at least a partial second back panel layer of the rigid material. The first back panel layer has sides and a thickness substantially similar to the first thickness and the second back panel layer extends past each of the sides of the first back panel layer by the first thickness.

When assembled, the first wall layers of each of the plurality of walls combine to form a first post and lintel assembly. The second wall layers of each of the plurality of walls combine to form a second post and lintel assembly distinct from the first post and lintel assembly.

In some embodiments, the at least two layers of rigid material are bonded. In some embodiments, the plurality of walls is four walls.

In some embodiments, the second back panel layer is a plurality of battens defining a border of the first back panel layer. In some such embodiments, the plurality of battens of the second back panel layer forms a third post and lintel assembly.

In some embodiments, the rigid material is a solid non-corrugated board material.

In some embodiments, when assembled, the first back panel layer abuts the sides of the first wall layer of each of the plurality of walls. The second back panel layer then rests on the sides of the second wall layer of each of the plurality of walls, and the first back panel layer is enclosed on all sides by the second wall layers of the plurality of walls.

In some embodiments, the crate further includes a plurality of corner cleats, each cleat having two panels of rigid material butted together at a joint. When assembled, each joint of two walls is overlayed with a corresponding cleat.

In some such embodiments, each of the plurality of walls has a substantially similar second wall layer width. Each of the two panels forming the cleats has a substantially similar cleat panel length larger than the second wall layer width by twice the first thickness. As such, when applied to the joints of two walls, a first end of each cleat panel extends past a first corresponding side of the underlying second wall layer by the first thickness and a second end of each cleat panel extends past a second corresponding side of the underlying second wall layer by the first thickness.

In some such embodiments, frame battens are rotatably fixed to the second wall layer opposite the back panel, such that when in a closed configuration, a first face of each of the frame battens rests on the sides of the second wall layer of each of the plurality of walls and a second face of each of the frame battens opposite the first face is flush with the second ends of each of the cleat panels.

In some such embodiments, when in the closed configuration, the frame battens form a fourth post and lintel assembly.

In some alternative such embodiments, the shipping crate further includes a lid panel. The lid panel may then rest on the sides of the first wall layer such that when in the closed configuration, the first face of each of the frame battens rests on an outer face of the lid panel, and an outer edge portion of the lid panel is sandwiched between the first wall layer and the frame battens.

In some embodiments utilizing corner cleats, for each corner cleat, the two panels of rigid material are butted together in a configuration matching the corresponding joint of two walls, such that each panel extends past the underlying second wall layer by the first thickness at the joint.

In some embodiments, the shipping crate of claim includes handles fixed to an outer surface of at least one wall and abutting a corresponding corner cleat.

In some embodiments, one of the plurality of walls is defined as a bottom panel, and two skids are fixed to an outer surface of the bottom panel and each of the two skids abut a corresponding corner cleat.

In some embodiments, all joints are glued prior to assembly and taped after assembly.

In some embodiments, two of the plurality of walls are defined as side walls, one is defined as a top wall, and one is defined as a bottom wall. The two first wall layers and the second wall layers of the side walls are the posts of the first and second post and lintel assemblies respectively. The first and second wall layers of each of the top wall and the bottom wall are then lintels for the corresponding assemblies.

In some embodiments, the second back panel layer includes a plurality of battens arranged in a third post and lintel assembly defining a border of the first back panel layer, and when assembled, the battens adjacent the side walls are the posts of the third post and lintel assembly and the battens adjacent the top and bottom walls are the lintels for the corresponding assemblies.

In such an embodiment, the shipping crate may further include frame battens rotatably fixed to the second wall layer opposite the back panel, such that when in a closed configuration, a first face of each of the frame battens rests on the sides of the second wall layer of each of the plurality of walls and form a fourth post and lintel assembly, and wherein the frame battens adjacent the side walls are the posts of the fourth post and lintel assembly and wherein the frame battens adjacent the top and bottom walls are the lintels for the corresponding assemblies.

Also provided is a method for assembling a shipping crate as described above. During assembly, for each of a plurality of walls, the method includes preparing a first wall layer of a rigid material and a second wall layer of a rigid material, the first wall layer having a width, a length, sides, and a first thickness.

The method then includes sizing the second wall layer for each of the plurality of walls such that it has a width larger than the width of the first wall layer by twice the first thickness and a length larger than the first wall layer by twice the first thickness.

The method then includes assembling the first wall layer and the second wall layer such that the second wall layer extends past each side of the first wall layer by the first thickness.

The method then includes preparing a first back panel layer having sides and a thickness, the thickness substantially similar to the first thickness, and applying at least a partial second back panel layer to the first back panel layer such that the second back panel layer extends past each of the sides of the first back panel layer by the first thickness.

The method then includes assembling the plurality of walls such that the first wall layer of each of the plurality of walls forms a first post and lintel assembly and the second wall layer of each of the plurality of walls forms a second post and lintel assembly, and locating the back panel such that the first back panel layer rests on the sides of the first wall layer of the plurality of walls and the second back panel layer rests on sides of the second wall layer of the plurality of walls.

In some embodiments, after sizing the second wall layer, the first wall layer is positioned relative to the second wall layer using a jig while assembling the first wall layer and the second wall layer.

In some embodiments, prior to assembling the plurality of walls, glue is applied to each joint, and after assembling the plurality of walls each joint is taped.

In some embodiments, the second back panel layer is formed from a plurality of battens defining a border of the first back panel layer.

DETAILED DESCRIPTION OF THE PREFERRED EMBODIMENTS

Figure 1:
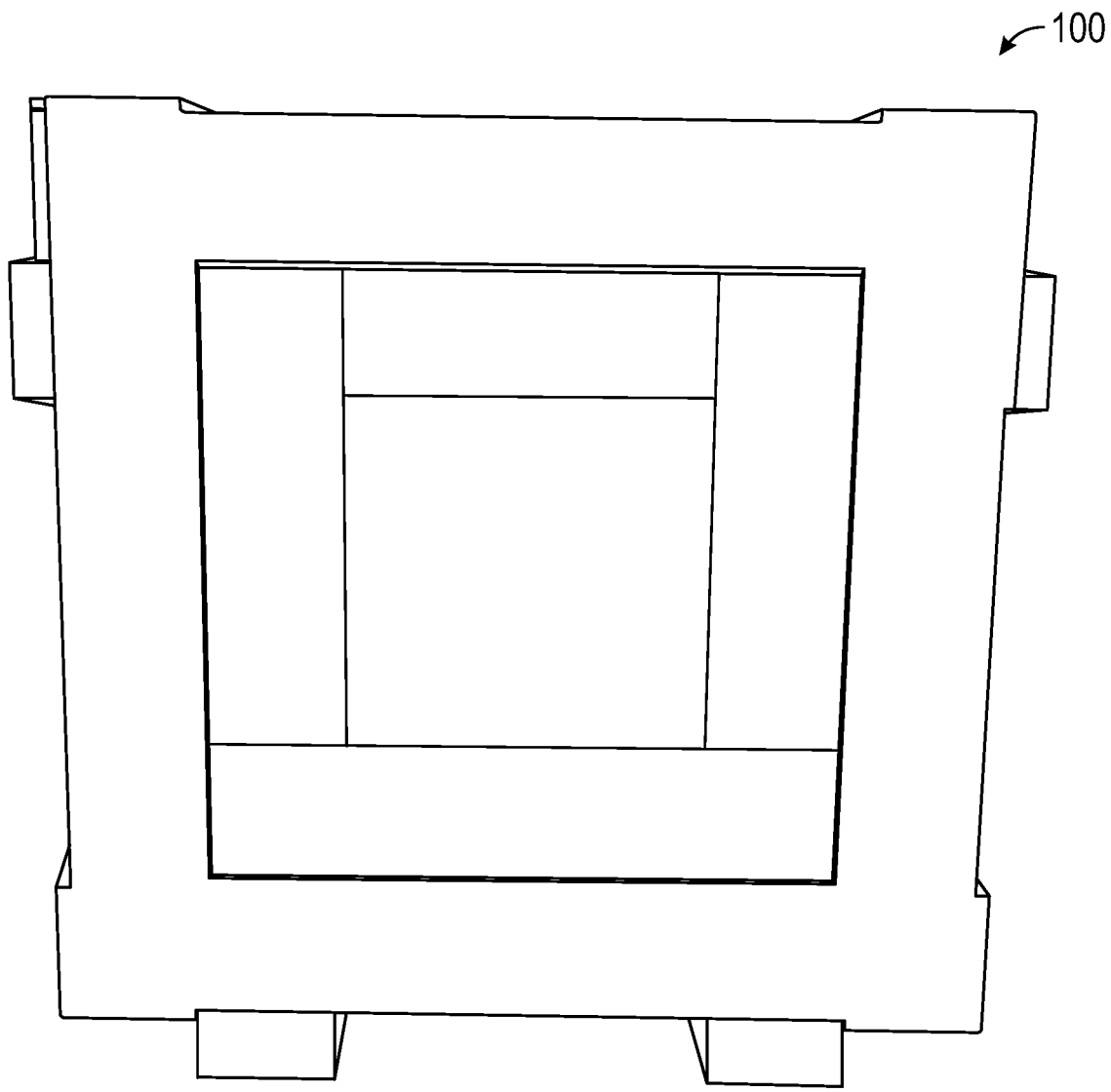
FIG. 1 is an assembled shipping crate in accordance with this disclosure.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

Figure 2:
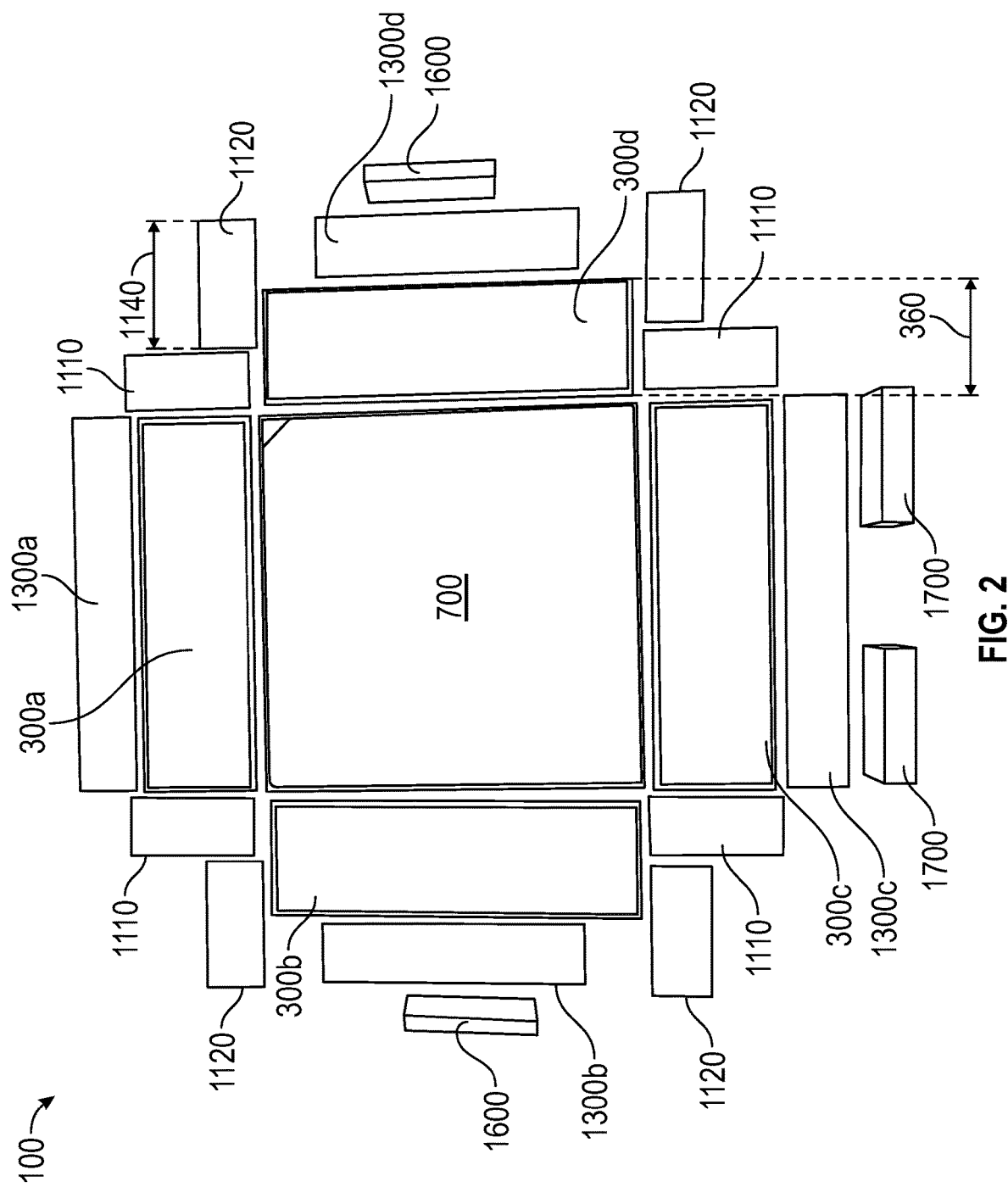
FIG. 2 is an exploded view showing components of the shipping crate of FIG. 1.

FIG. 1 is an assembled shipping crate 100 in accordance with this disclosure. FIG. 2 is an exploded view showing components of the shipping crate 100 of FIG. 1. The exploded view of FIG. 2 shows most components of the embodiment of the shipping crate 100 described herein, and will be referred back to throughout this disclosure.

Figure 3:
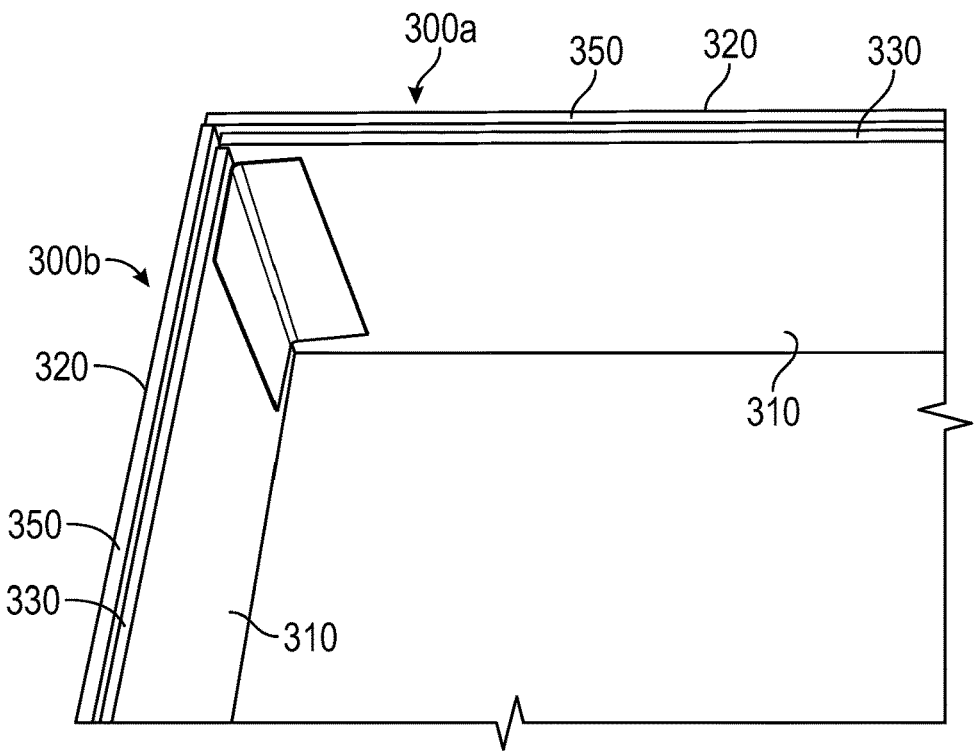
FIG. 3 shows two walls of a partially assembled shipping crate in accordance with this disclosure.
Figure 4:
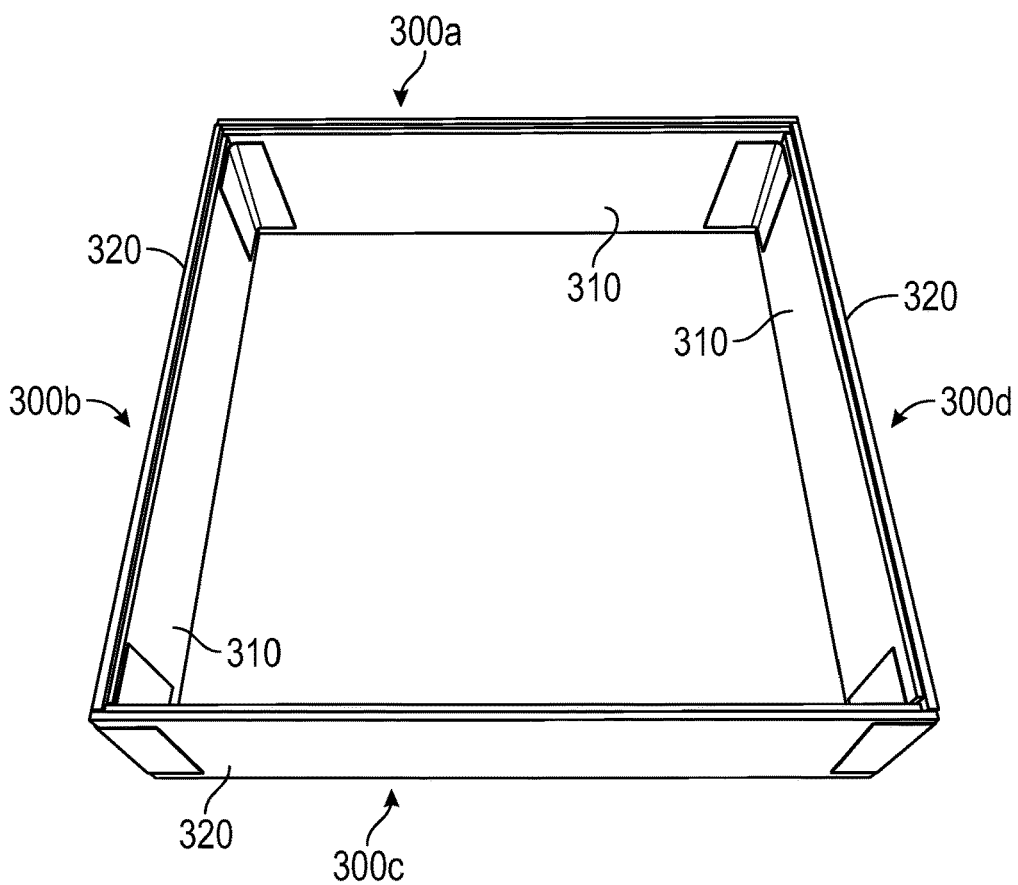
FIG. 4 shows four walls of the partially assembled shipping crate.
Figure 5:
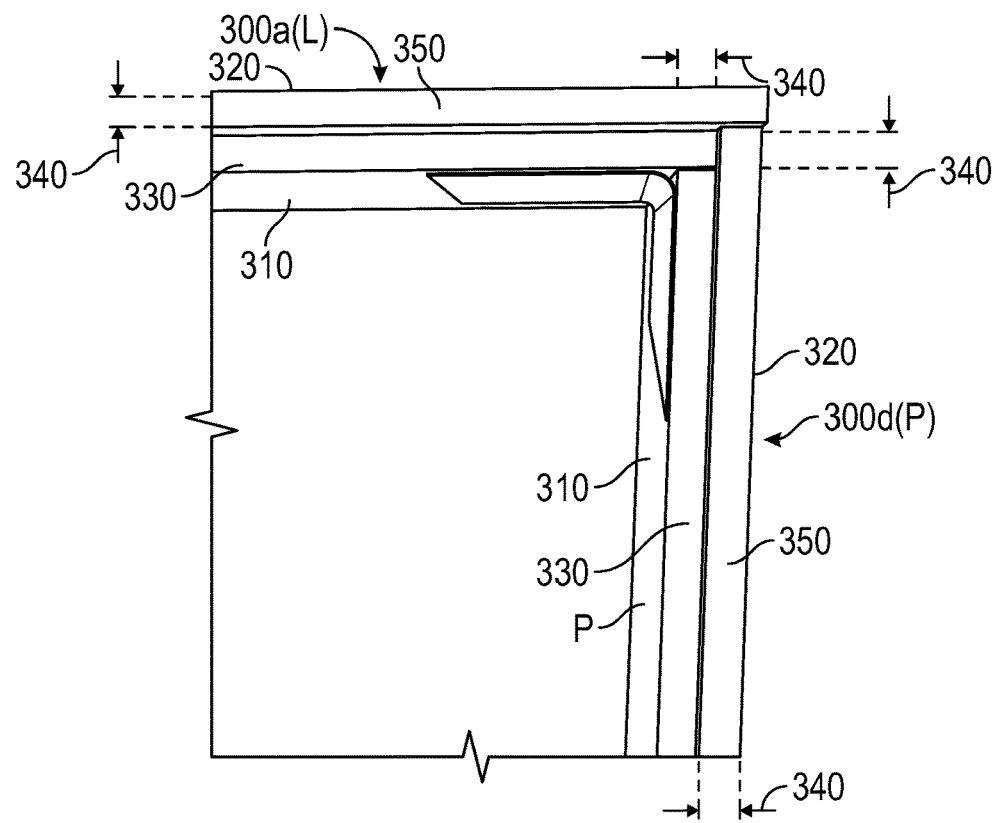
FIG. 5 shows a detailed view of two walls of the partially assembled shipping crate.
Figure 6:
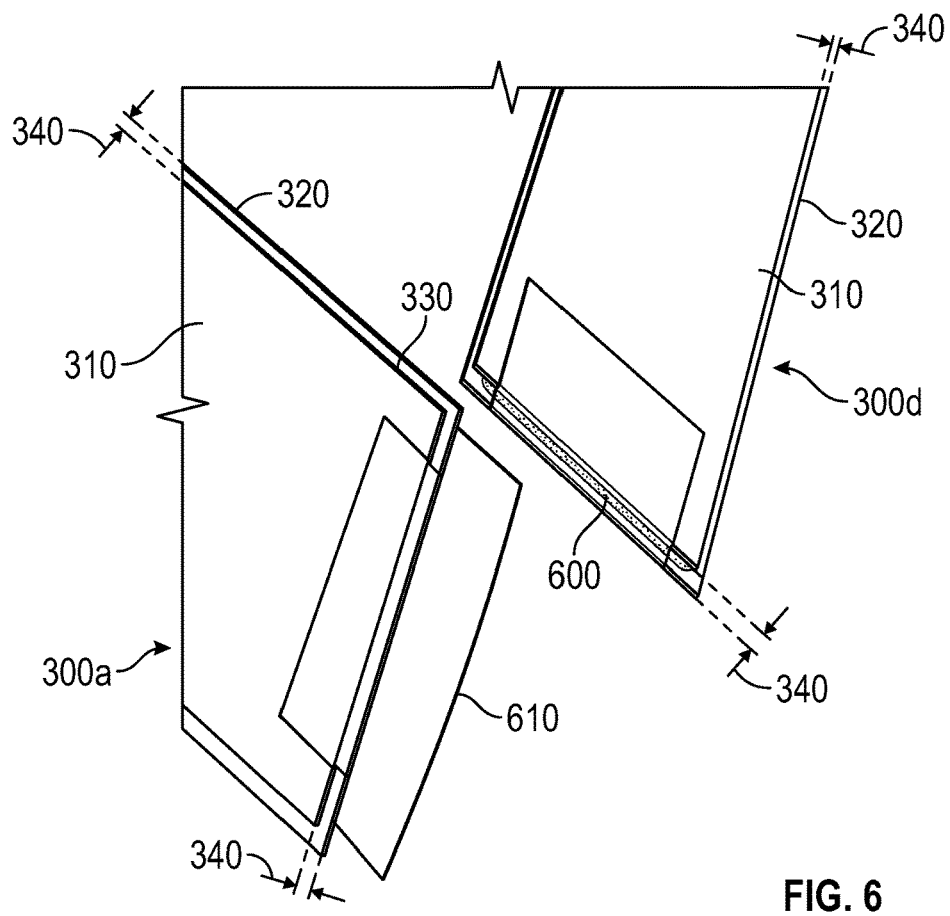
FIG. 6 shows the two walls of FIG. 5 disassembled.

FIG. 3 shows two walls 300a, b of a partially assembled shipping crate 100. FIG. 4 shows four walls 300a-d of the partially assembled shipping crate 100. FIG. 5 shows a detailed view of two walls 300a, d of the partially assembled shipping crate 100. FIG. 6 shows two walls 300a, d of FIG. 5 disassembled.

Figure 7:
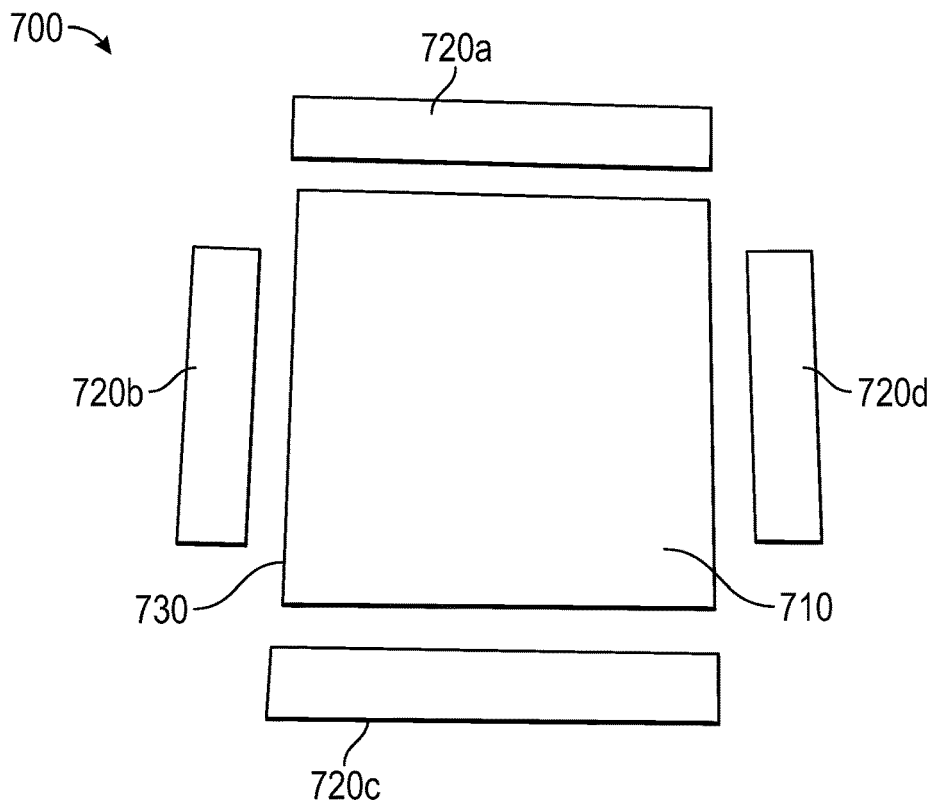
FIG. 7 shows an exploded view of a back panel for use in the assembled shipping crate of FIG. 1.
Figure 8:
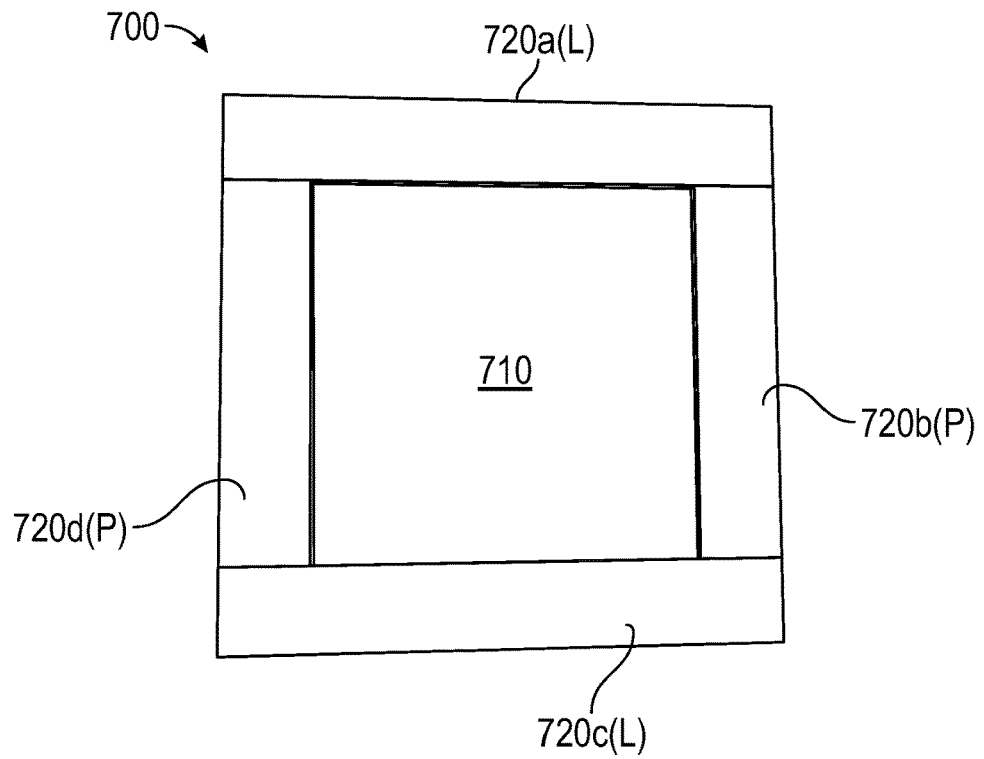
FIG. 8 shows a front view of an assembled back panel for use in the assembled shipping crate.
Figure 9:
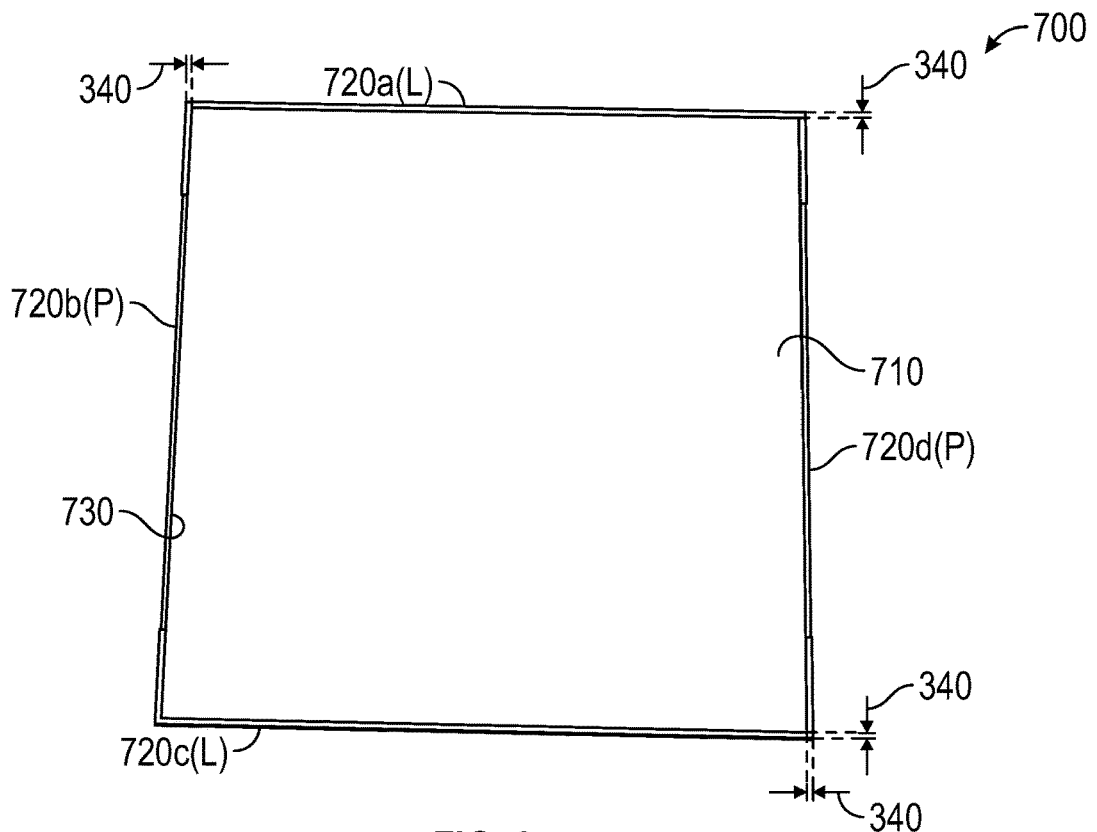
FIG. 9 shows a back view of the assembled back panel of FIG. 8.
Figure 10:
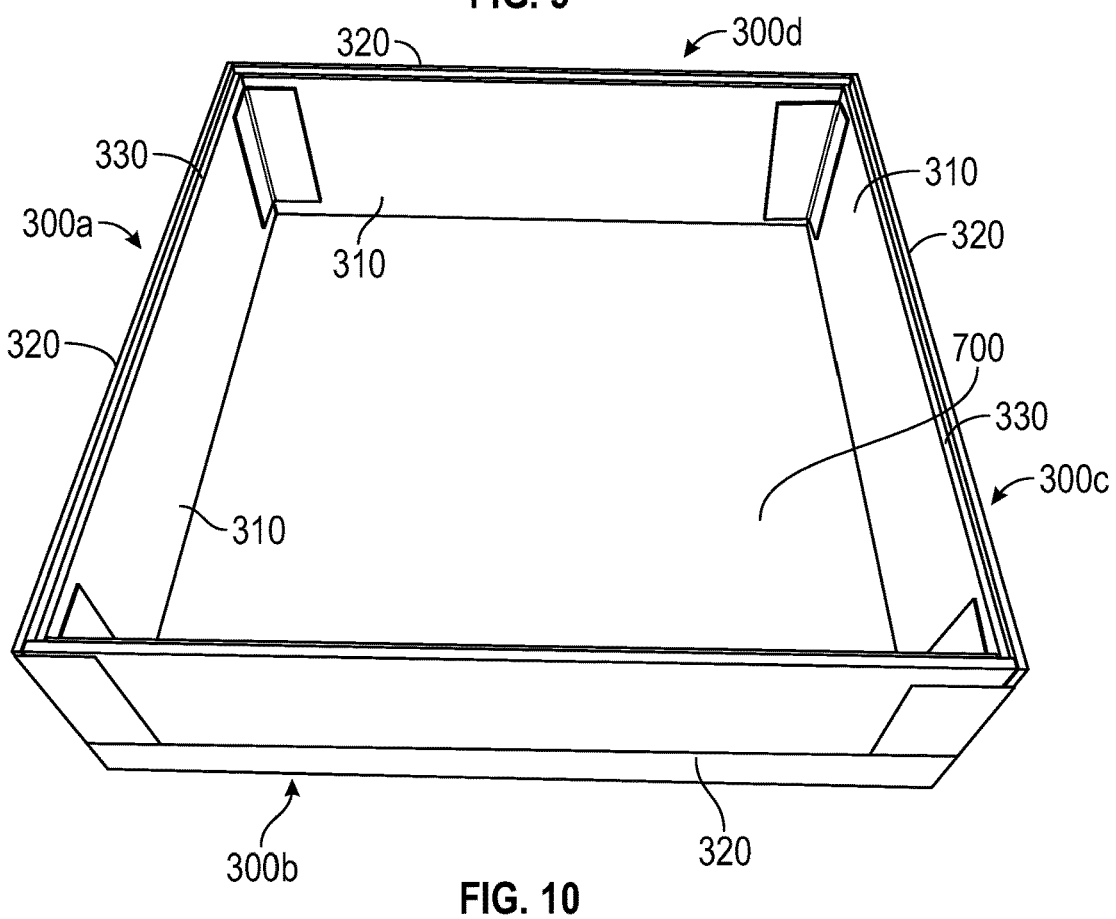
FIG. 10 shows the four walls of FIG. 4 assembled with the back panel of FIG. 8.

FIG. 7 shows an exploded view of a back panel 700 for use in the assembled shipping crate of FIG. 1. FIG. 8 shows a front view of an assembled back panel 700 for use in the assembled shipping crate. FIG. 9 shows a back view of the assembled back panel 700 of FIG. 8. FIG. 10 shows the four walls 300a-d of FIG. 4 assembled with the back panel 700 of FIG. 8.

As shown, the shipping crate 100 has a plurality of walls 300a-d, typically four walls, as shown. Each wall 300a-d comprises at least two distinct layers 310, 320 of rigid material. The rigid material is a non-corrugated material, such as a solid board. The individual boards may comprise multiple plies of paperboard, and may be referred to as ply board.

Generally, the crate 100 described herein may be assembled from 100% recyclable materials. Accordingly, the boards used are typically paper boards or other solid ply board, while tapes and glues are biodegradable or recyclable. In some embodiments, the sealing tape may be reinforced with fiberglass thread, which is screened out as part of the paper repulping process. In such embodiments, the fiberglass thread may be the only component that is not biodegradable. In some embodiments, certain components, such as handles and skids discussed in more detail below, may be fixed to the crate 100 using non-biodegradable materials. Such materials may be, for example, staples, which may be used minimally and may be removed prior to recycling the crate 100.

The two distinct layers 310, 320 forming each wall are sized such that a first wall layer 310 of the at least two layers of each wall has sides 330 and a first thickness 340, and a second wall layer 320 has sides 350 extending past each of the sides 330 of the corresponding first wall by the first thickness. In this way, when viewed with the first layer 310 on top, the second layer 320 extends on each side 330 of the first layer by a width corresponding to the thickness 340 of the first layer. The second layer 320 thereby provides a lip extending past the first layer 310.

As shown in FIG. 6, the two layers 310, 320 may be initially bonded together prior to assembling the plurality of walls 300*a-d* into a partial assembly. In some embodiments, this may be by applying an adhesive between the layers and taping the layers together, as shown. In some embodiments, the adhesive is applied and the layers 310, 320 are then fixed together in other ways, such as by stapling the wall layers. Such stapling serves to clamp the layers 310, 320 together as the adhesive dries, resulting in a strong bond between layers.

In the embodiment shown, all boards have layers with thicknesses that are substantially the same as the first thickness 340. Some components are formed from multiple layers, while others are formed from single layers. The boards having the same thicknesses 340 generally allows panels to interlock such that the unique geometry described herein is possible and reinforces the stability of the shipping crate 100 as a whole.

The shipping crate 100 further comprises a back panel 700 with a first back panel layer 710 formed from the rigid material and at least a partial second back panel layer 720*a-d*. As shown, the second back panel layer may itself comprise distinct components 720*a-d*. However, in other embodiments, the second back panel may be a complete back panel.

The first back panel layer 710 has sides 730 and a thickness corresponding to the first thickness 740, and as discussed above, the thickness of the first back panel layer is typically identical, or substantially similar to, the first thickness 340. Similarly, the second back panel layer 720*a-d*, whether it is a single complete panel layer or whether it is formed form discrete components, typically also has a thickness corresponding to the first thickness 340. When assembled, the second back panel layer 720*a-d* extends past each of the sides 730 of the first back panel layer 710 by the first thickness 340. As such, when viewed with the first back panel layer 710 on top, as shown in FIG. 9, the second back panel layer 720*a-d* extends on each side 730 of the first back panel layer by a width corresponding to the thickness 340 of the first layer.

When the walls 300*a-d* and the back panel 700 are assembled, the first wall layers 310 of each of the plurality of walls 300*a-d* combine to form a first post P and lintel L assembly and the second wall layers 320 of each of the plurality of walls 300*a-d* combine to form a second post P and lintel L assembly. The second post and lintel assembly is distinct from the first such assembly, and the two assemblies are nested together. This arrangement is most clearly seen in FIG. 5, but appears throughout the figures. It is noted that the post and lintel assembly described here will repeat throughout the shipping crate 100 shown, and for each such assembly, the post will be labeled P and the lintel will be labeled L for clarity.

The first 310 and second 320 layers are bonded, or otherwise laminated together such that they are fixed in the positions described. Accordingly, because the second layer 320 of each wall 300*a-d* extends past the sides 330 of the first layer 310 of the corresponding wall, the two distinct post P and lintel L arrangements are nested, and tend to reinforce each other. As such, for any given wall 300*a-d*, both the first and second layer 310, 320 will form either a post P or a lintel L.

As noted above, the back panel 700 comprises a first back panel layer 710 and a second back panel layer 720*a-d*. The second back panel layer 720*a-d* typically comprises a set of four battens which define a border of the first back panel layer 710, when viewed from the back, as shown in FIG. 8. When viewed from the front, as shown in FIG. 9, each batten extends past the corresponding side 730 of the first back panel layer 710 by the first thickness 340, as discussed above.

The four battens 720*a-d* comprising the second back panel layer form a third post P and lintel L assembly, and when assembled with the walls 300*a-d*, the two battens 720*b, d* forming posts P of the third post and lintel assembly align with the walls 300*b, d* containing posts of the first and second post and lintel assemblies. Similarly, the two battens 720*a, c* forming lintels L of the third post and lintel assembly align with the walls 300*a, c* containing lintels of the first and second post and lintel assemblies.

When assembled, the first back panel layer 710 rests against and abuts the sides 330 of the first wall layer 310 of each of the corresponding plurality of walls 300*a-d*. The first back panel layer 710 is then enclosed on all sides 730 by the second wall layers 320 of the plurality of walls 300*a-d*. In this way, the first back panel layer 710, taken as a whole, functions as a post while the second wall layer 320 forms a lintel for yet another post and lintel assembly. The battens forming the second back panel layer 720*a-d* rest on and abut the sides of the second wall layer 320 of each of the plurality of walls 300*a-d*.

In this way, the sides 730 of the first back panel layer 710 abut the lip of the second wall layer 320 of each of the four walls 300*a-d*, while the second back panel layer rests outside of a width of the walls and abuts a side of the second wall layer 320 of each of the walls. Accordingly, when assembled sides of the second back panel layers 720*a-d* are flush with an outer surface of the second wall layers 320 of each of the walls 300*a-d*.

In some alternative embodiments, when assembled, the second back panel layer 720*a-d* rests against the sides 330 of the first wall layer 310 of each of the corresponding plurality of walls 300*a-d*. The first back panel layer 710 is then fully enclosed by the first wall layers 310.

It is noted that in many embodiments, two of the plurality of walls 300*b, d* may be defined as side walls, one wall 300*a* may be defined as a top wall, and one wall 300*c* may be defined as a bottom wall. Accordingly, as noted above, the two first wall layers 310 and the two second wall layers 320 of the side walls 300*b, d* are the posts P of the first and second post and lintel assemblies respectively. Similarly, the first and second wall layers 310, 320 of each of the top wall 300*a* and the bottom wall 300*c* are lintels L for the corresponding assemblies.

The second back panel layer 720*a-d* may then comprise a plurality of battens arranged in a third post and lintel assembly defining a border of the first back panel layer 710, and when assembled, the battens 720*b, d* adjacent the side walls 300*b, d* are the posts P of the third post and lintel assembly, and the battens 720*a, c* adjacent the top and bottom walls 300*a, c* are the lintels L for the corresponding assemblies. As discussed below with respect to FIG. 13, the same pattern is repeated with respect to the frame battens 1300*a-d*.

It will be understood that the crates 100 described herein can be assembled in a wide variety of dimensions, so long as the various post and lintel configurations are repeated. Accordingly, the walls 300*a-d* may be provided with different widths in order to correspond to a desired interior space and shape. As such, while the crate 100 illustrated herein is generally flat, with a back panel 700 larger than the side walls 300a-d, this configuration is provided as an example, and other configurations are contemplated.

Figure 11:
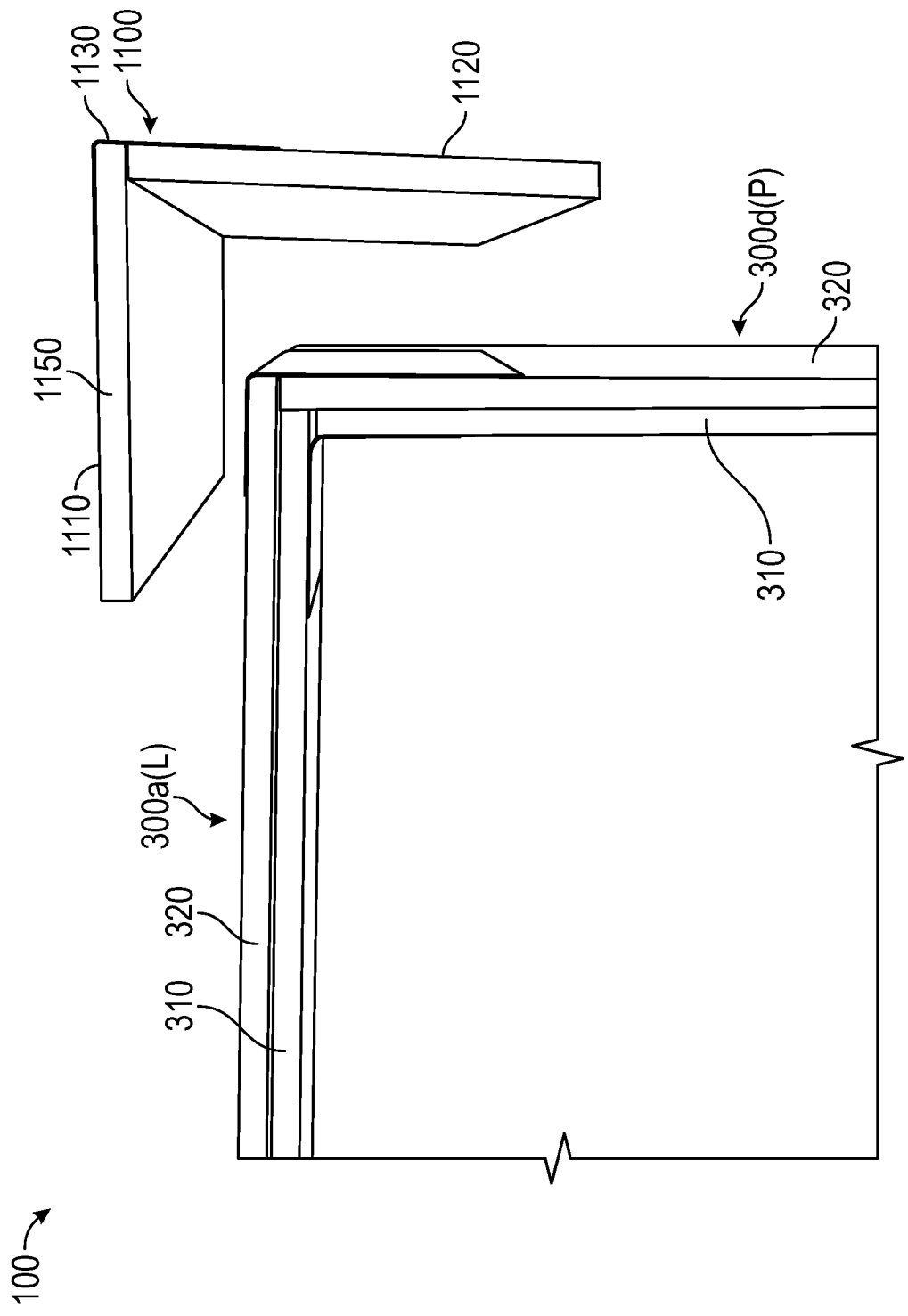
FIG. 11 shows a cleat positioned relative to the partially assembled shipping crate of FIG. 10.
Figure 12:
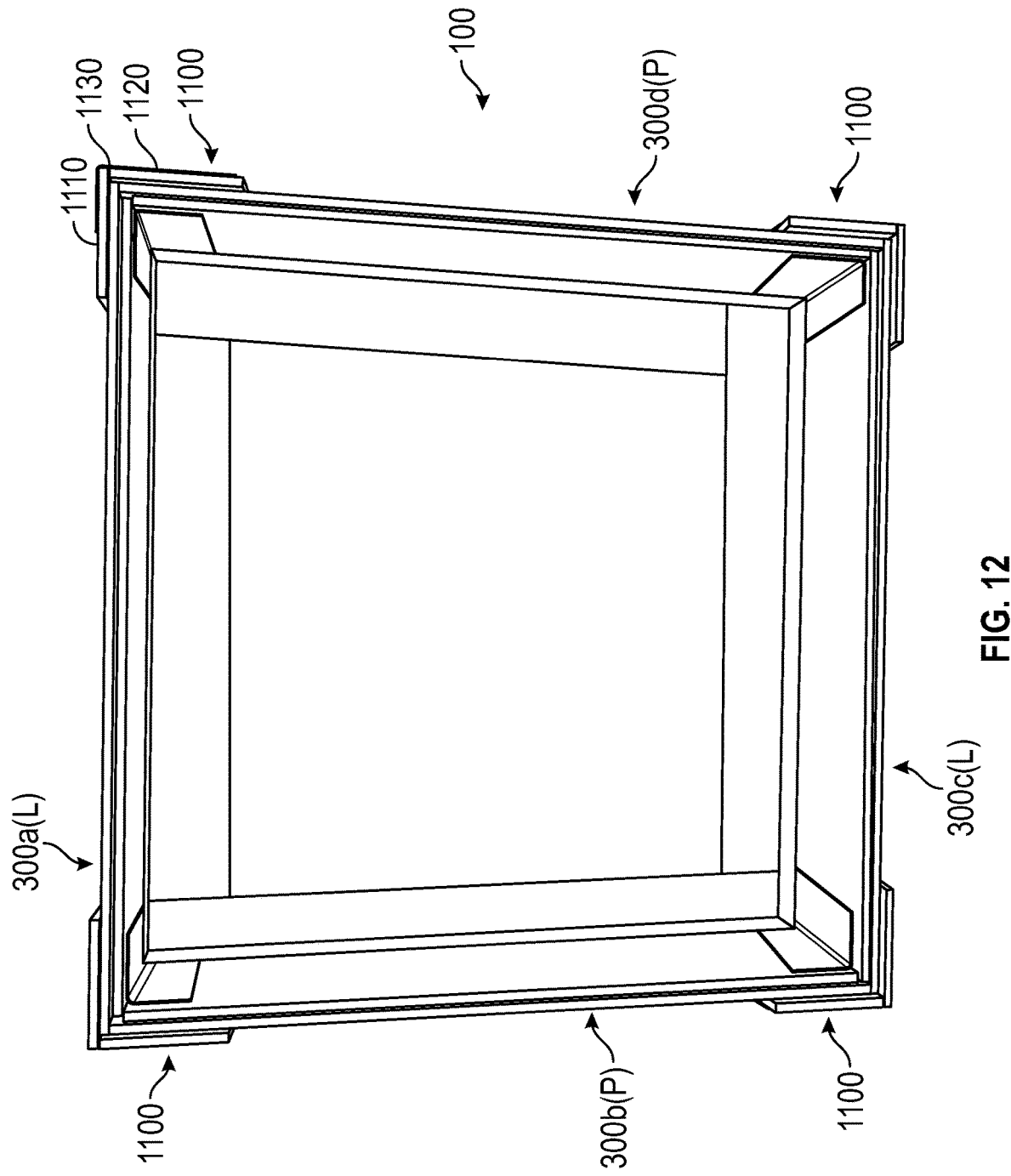
FIG. 12 shows the partially assembled shipping crate with cleats applied to each corner.

FIG. 11 shows a cleat 1100 positioned relative to the partially assembled shipping crate 100 of FIG. 10. FIG. 12 shows the partially assembled shipping crate 100 with cleats 1100 applied to each corner.

As shown, the shipping crate 100 is provided with cleats 1100. Each cleat comprises two cleat panels 1110, 1120 of rigid material butted together at a joint 1130. When assembled, each joint of two walls 300a-d of the crate 100 is overlayed with a corresponding cleat 1100.

Generally, each of the plurality of walls 300a-d has a substantially similar second wall layer width 360, as shown in FIG. 2. As such, when the four walls 300a-d are assembled, a front and back of that assembly are flush. This is seen, for example, in FIGS. 3 and 4, where the walls are assembled alone. Each of the two cleat panels 1110, 1120 forming the cleats 1100 are then provided with a length 1140 larger than the second wall layer width 360, and are butted together at the joint 1130 along their lengths.

Typically, the cleat panels 1110, 1120 of the cleats 1100 are longer than the second wall layer width 360 by the first thickness 340 or twice the first thickness 340. Accordingly, when fixed to the walls 300a-d, a second end 1150 of each cleat 1100 extends past a front edge of each of the walls by the first thickness 340. As noted above, in some embodiments, at least part of the back panel 700, such as the battens 720a-d, rests outside of the walls 300a-d and abuts the sides of the second wall panels 320. In such embodiments, the cleats 1100 each have a length 1130 longer than the second wall layer width 360 by twice the first thickness 340.

When assembled, as shown in FIG. 12, the two cleat panels 1110, 1120 of each cleat 1100 are butted together in a configuration matching the corresponding joint of the corresponding two walls 300a, d. Accordingly, as is most clearly shown in FIG. 11, where a side wall 300d of the crate forms a post P and a top wall 300a forms a lintel L for a post and lintel assembly, the cleat 1100 overlaying that will be arranged such that a panel 1120 of the cleat overlaying the side wall 300d abuts a side of the cleat panel 1110 overlaying the top wall 300a. Accordingly, each cleat panel 1110, 1120 extends past the underlying second wall layer 320 by the first thickness 340 at the joint 1130.

Figure 13:
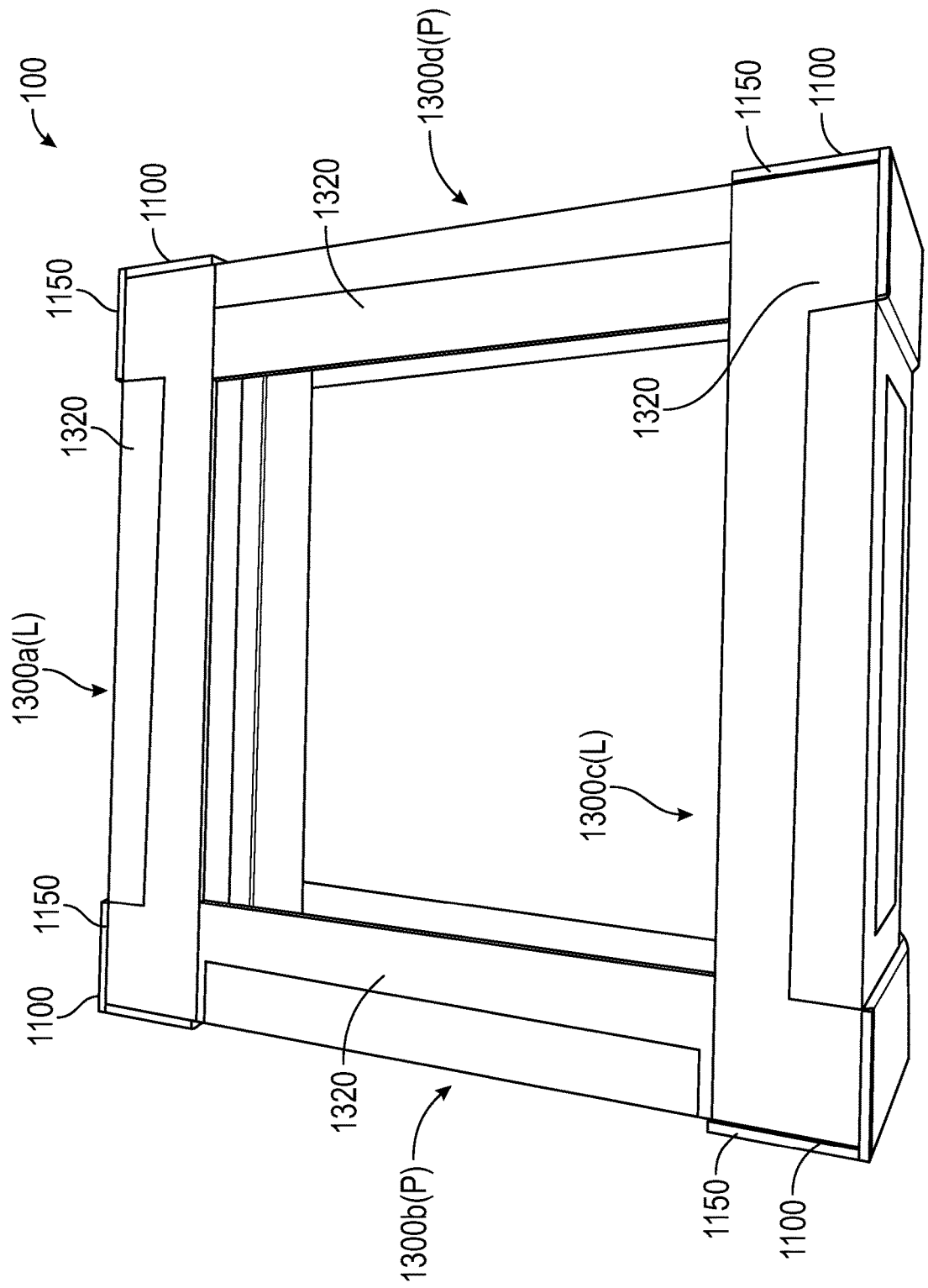
FIG. 13 shows the partially assembled shipping crate with battens applied at a front of the crate.
Figure 14:
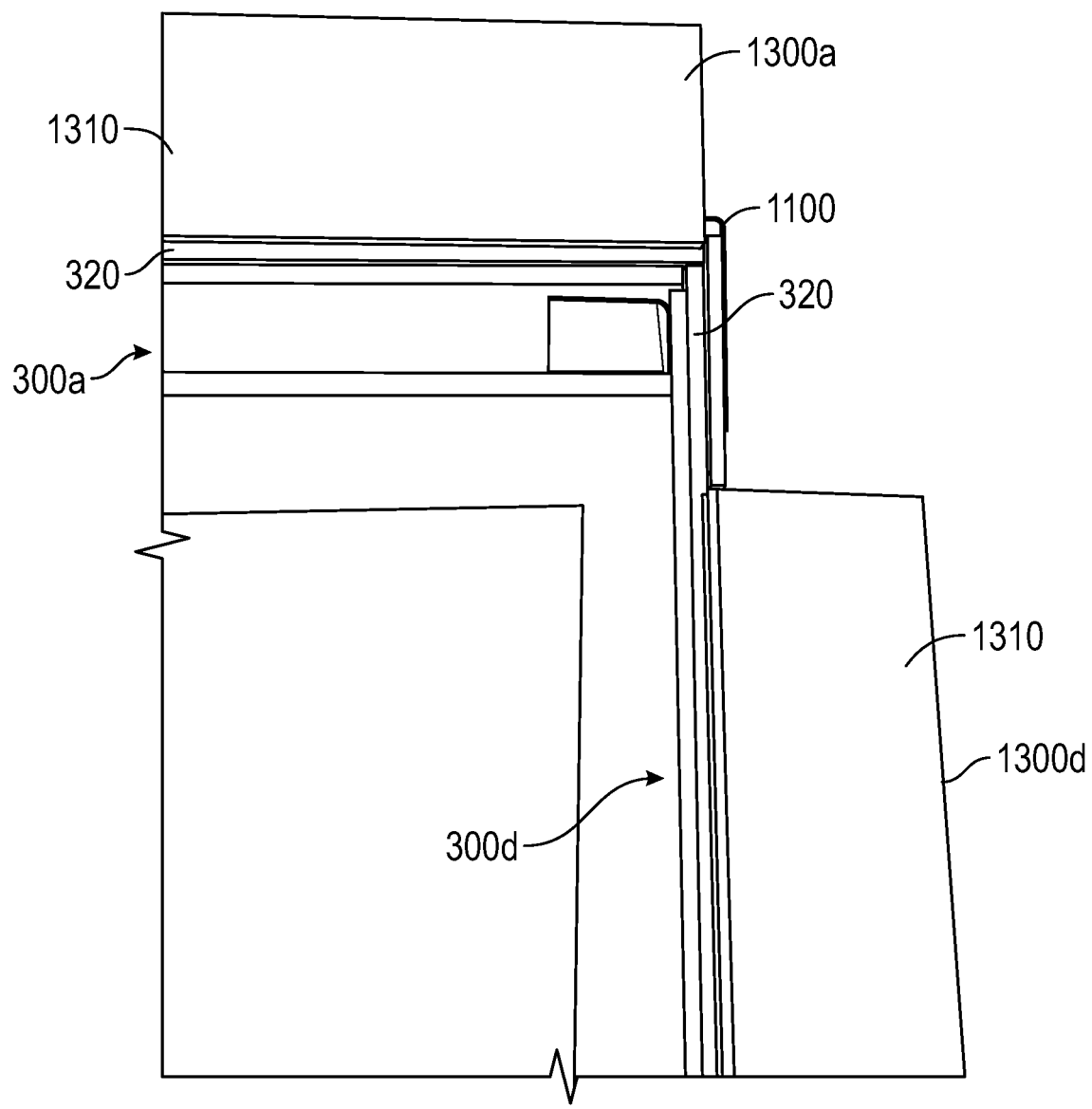
FIG. 14 shows the partially assembled shipping crate of FIG. 13 with the battens in an open position.

FIG. 13 shows the partially assembled shipping crate 100 with frame battens 1300a-d applied at a front of the crate. FIG. 14 shows the partially assembled shipping crate 100 of FIG. 13 with the battens 1300a-d in an open position.

As shown, the frame battens 1300a-d are rotatably fixed to the second wall layer 320 of each wall 300a-d opposite the back panel 700. When in a closed configuration, as shown in FIG. 13, a first face 1310 of each of the frame battens 1300a-d rests on the sides of the second wall layer 320 of each of the corresponding plurality of walls 300a-d. A second face 1320 of each of the frame battens 1300a-d opposite the first face 1310 is flush with the second ends 1150 of each of the cleat panels 1110, 1120. As shown, when in the closed configuration, the frame battens 1300a-d form a fourth post P and lintel L assembly. This arrangement may be symmetric in the back, such that each cleat panel 1110, 1120 of the cleat 1100 extends past the back of the underlying wall 300a-d by the first thickness 340, such that they then enclose the second back panel layer 720. The second end of each cleat panel 1110, 1120 is then flush with an outer surface of the second back panel layer 720.

As shown, in some embodiments, the battens 1300a-d are fixed to the crate 100 after the cleats 1100 are fixed in place. In some embodiments, the cleats 1100, or at least the cleat panels 1110 of the cleats functioning as lintels L, are not fixed in place until after the battens 1300a-d are fixed to the second wall layers 320 of each wall 300a-d.

As discussed above with respect to the walls 300a-d and the back panel 700, the post and lintel assemblies may be aligned. Accordingly, when the frame battens 1300a-d are fixed to the second wall layer 320, they may be arranged such that the posts P of the fourth post and lintel assembly are adjacent the posts of the first, second, and third such assemblies, and such that the lintels L of the fourth post and lintel assembly are similarly adjacent the lintels of the corresponding assemblies.

Further, as shown, in some embodiments, a length of the frame battens 1300a, c forming the lintels L of the fourth post and lintel assembly correspond to a length of the second wall panel 320 of the corresponding wall 300a, c. In contrast, the length of the frame battens 1300b, d corresponding to the posts P may correspond to a length of the second wall panel 320 of the corresponding wall 300b, d less twice a width of the corresponding cleat panels 1110, 1120. The width of the frame battens 1300a-d may then correspond to the width of the cleat panels 1110, 1120, such that the frame battens 1300b, d forming the posts P can fold outwards past the corresponding cleats 1100 when in the open configuration.

Figure 15:
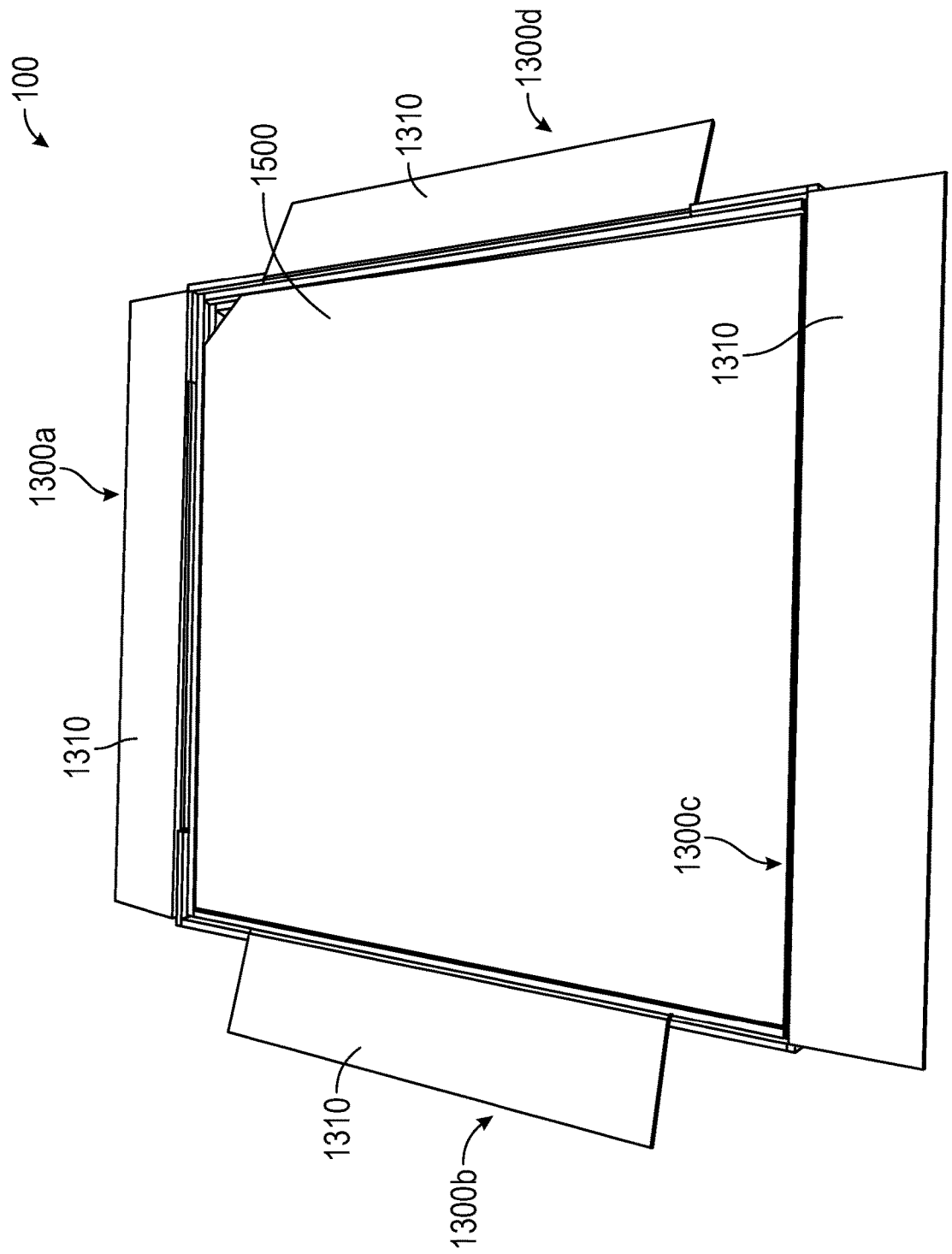
FIG. 15 shows the partially assembled shipping crate of FIG. 14 with a cover inserted.
Figure 16:
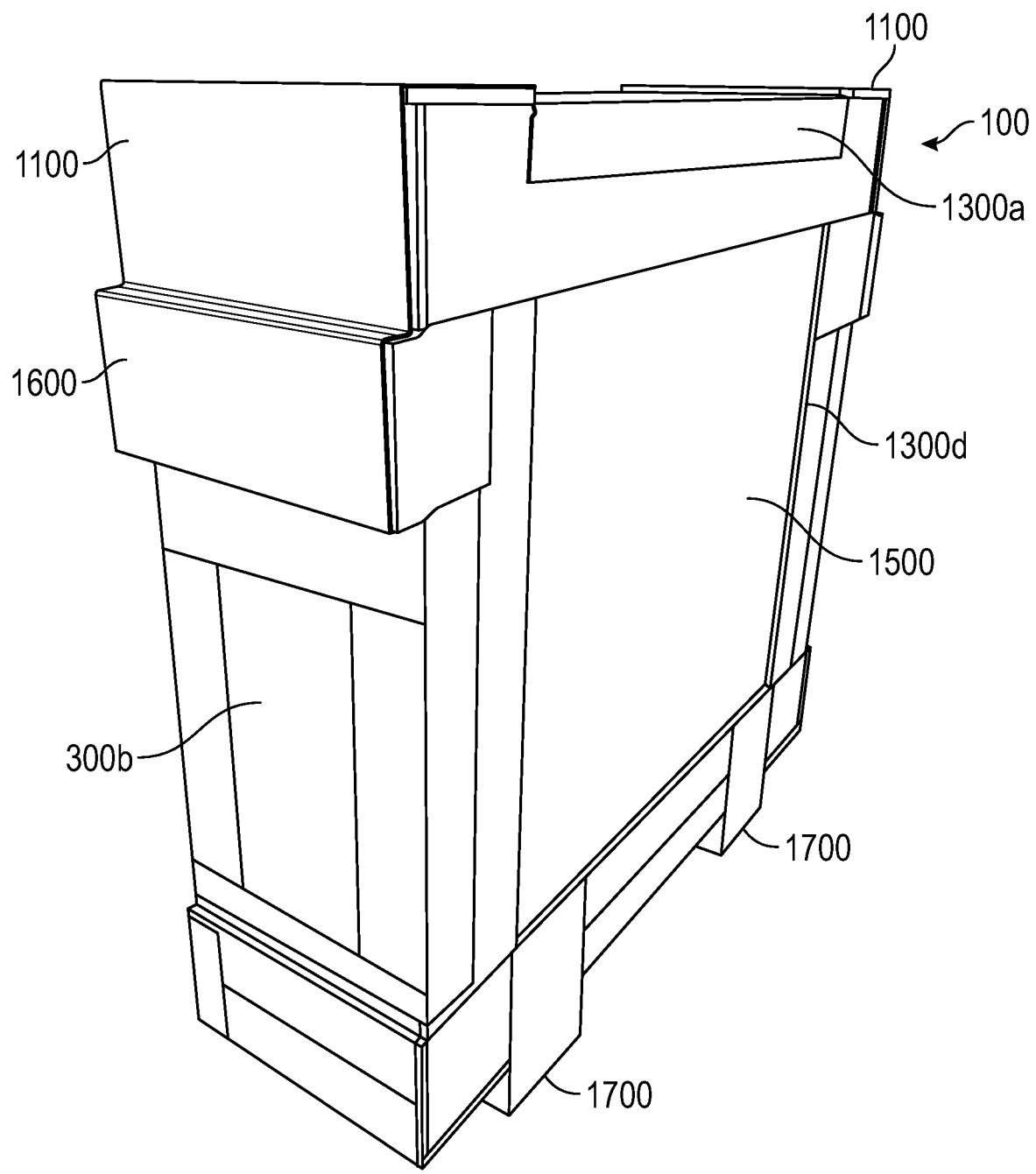
FIG. 16 shows a handle of an assembled shipping crate in accordance with this disclosure.

FIG. 15 shows the partially assembled shipping crate 100 of FIG. 14 with a cover 1500 inserted. Typically, the cover 1500 is a lid panel, and the lid panel rests on the sides of the first wall layer 310 of each corresponding wall 300a-d. Accordingly, when in the closed configuration, as shown in FIG. 16, the first face 1310 of each of the frame battens 1300a-d rests on an outer face of the lid panel 1500, which is then flush with the sides of the second wall layer 320 of each wall. As such, the lid panel 1500 is sandwiched between the first wall layer 310 and the frame battens 1300a-d and is bounded by the second wall layer 320.

FIG. 16 shows a handle 1600 of an assembled shipping crate 100 in accordance with this disclosure. As shown, the handle 1600 may be fixed to an outer surface of at least one of the walls 300a-d and may abut a corresponding cleat 1100. It is further noted that while the handle 1600 is shown abutting the cleat 1100, in some embodiments, such as in larger crates, the handles may be fastened at a standard or otherwise convenient location, such as a standard height of 20 inches from a bottom of the crate.

Figure 17:
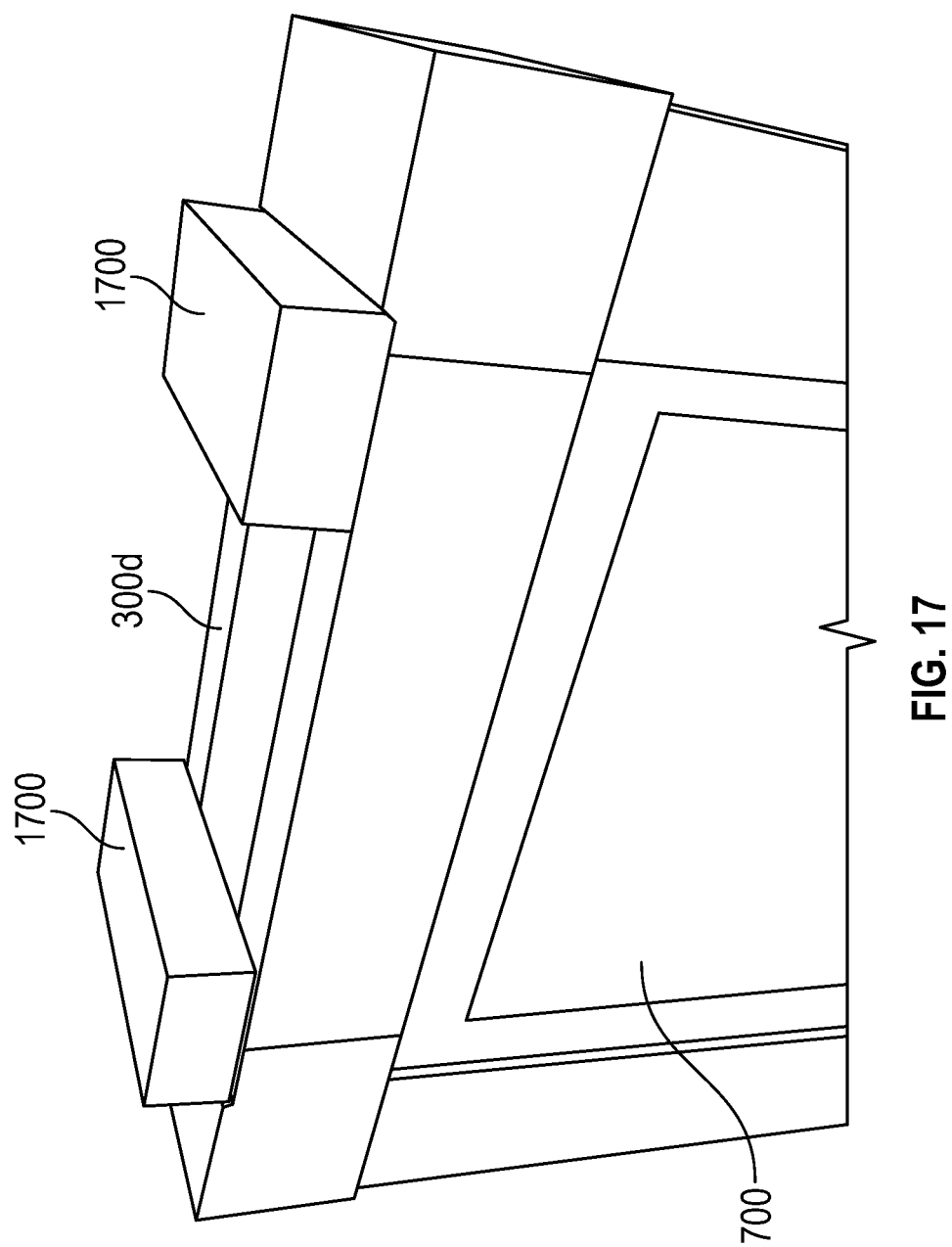
FIG. 17 shows skids of an assembled shipping crate in accordance with this disclosure.

FIG. 17 shows skids 1700 of an assembled shipping crate in accordance with this disclosure. In some embodiments, one of the plurality of walls 300c is defined as a bottom panel, and skids 1700 may be fixed to an outer surface of the bottom panel. As shown, two skids 1700 may be applied, and each of the two skids may be located adjacent to and abutting a corresponding cleat 1100.

In some embodiments, the handles 1600 and the skids 1700 may be fixed to the crate 100 using non-recyclable components, such as metal staples or the like. This may provide additional stability for the crate 100 while more securely fixing such structural components to the crate. Further, because the handles 1600 and skids 1700 are easily accessible, such components may be detached from the crate 100 such that the non-recyclable components can easily be removed and disposed of separately prior to recycling the remainder of the crate 100.

Figure 18:
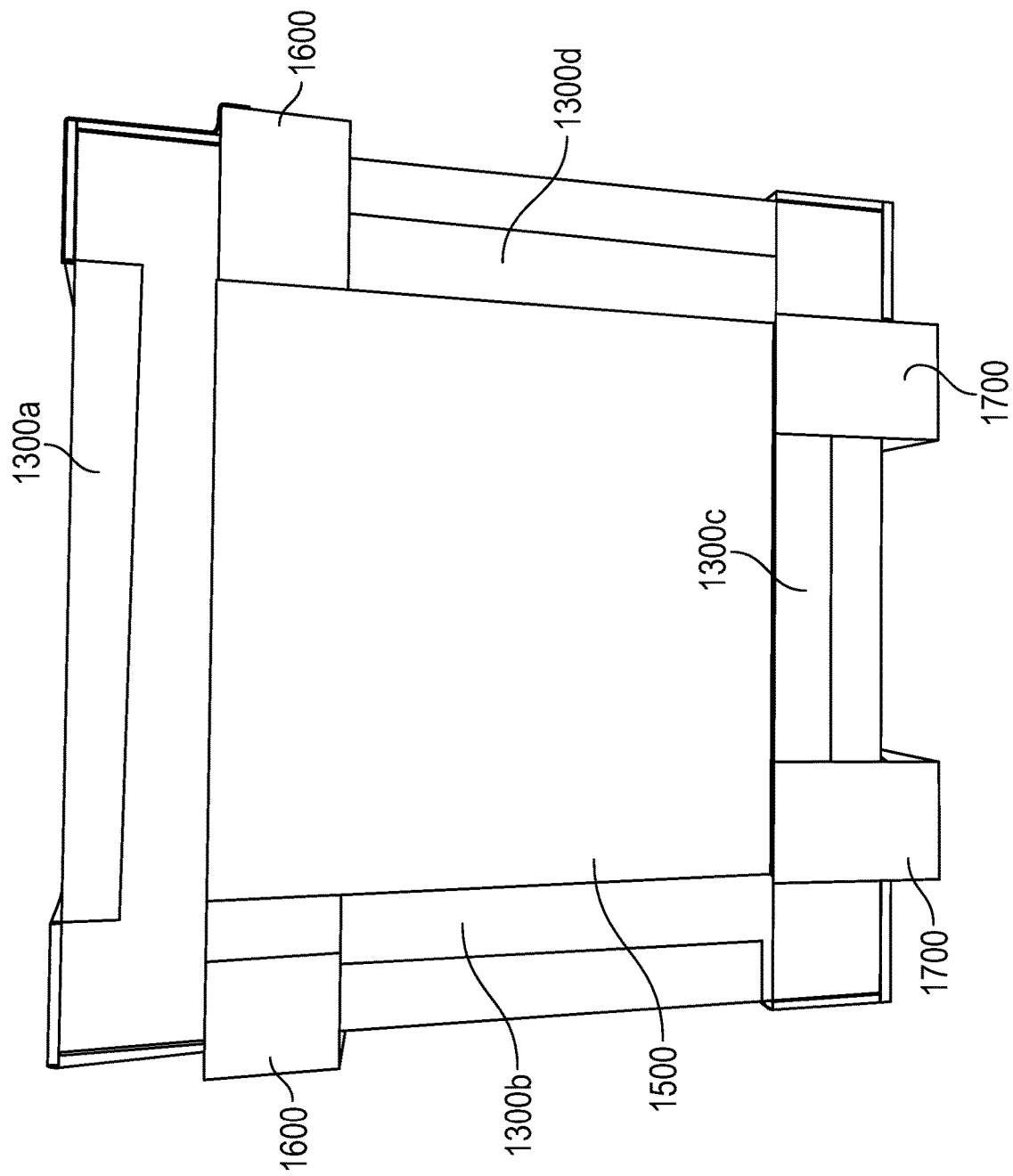
FIG. 18 shows a front view of an assembled shipping crate in an unsealed configuration.

FIG. 18 shows a front view of an assembled shipping crate 100 in an unsealed configuration. Once fully assembled, the shipping crate may be sealed with tape, resulting in the configuration shown in FIG. 1.

In some embodiments, each joint of the shipping crate 100 may be glued prior to assembly and taped following assembly. This is shown, for example, in FIG. 6 above, where a bead of glue 600 is applied to the unassembled joint and tape 610 is positioned but not yet fixed in place.

Figure 19:
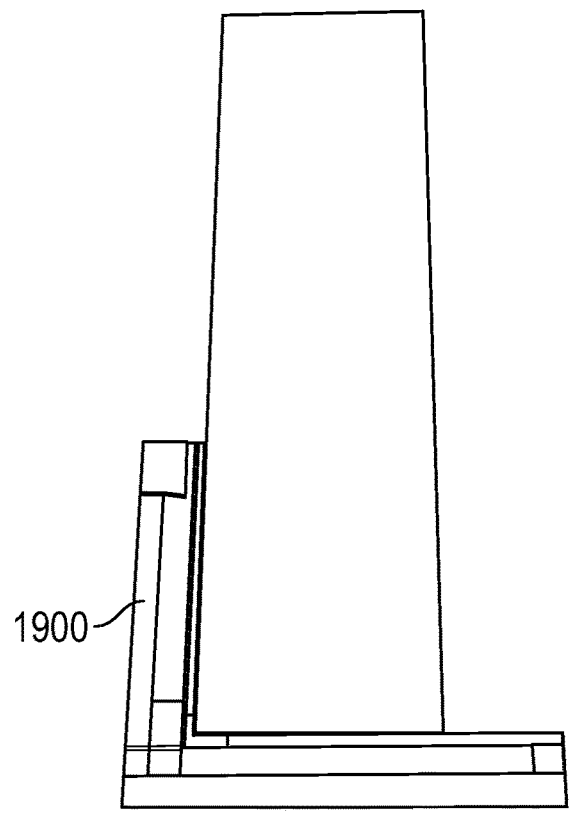
FIGS. 19 and 20 show the use of a jig to properly locate the layers of the walls of the shipping crate of FIG. 1.
Figure 20:
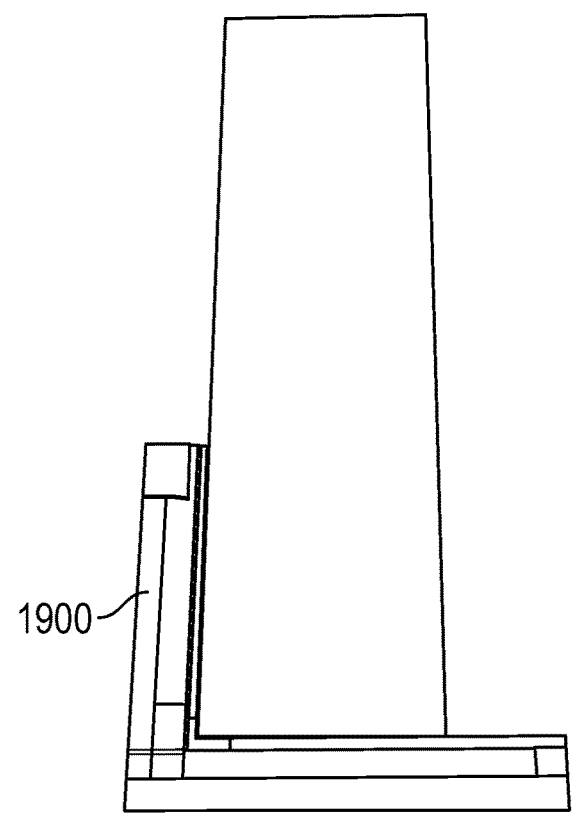

FIGS. 19 and 20 show the use of a jig 1900 to properly locate the layers 310, 320 of the walls 300a-d of the shipping crate 100 of FIG. 1.

Generally, the shipping crate 100 described herein may be assembled by first preparing a plurality of walls 300a-d. For each of the walls, a first wall layer 310 and a second wall layer 320 is prepared. Each of the layers 310, 320 are formed from a rigid material, and the first wall layer has a width, length, sides 330, and a first thickness 340.

The second wall layer 320 is then sized for each of the plurality of walls 300 such that it has a width larger than the width of the first wall layer 310 by twice the first thickness 340 and a length larger than the first wall layer by twice the first thickness.

The first wall layer 310 is then assembled with the second wall layer 320 such that the second layer extends past each side 330 of the first wall layer by the first thickness 340.

A first back panel layer 710 is similarly prepared having sides and a thickness, with the thickness being substantially similar to the first thickness 340. An at least partial second back panel layer 720a-d is then applied to the first back panel layer 710 so as to form the back panel 700. When assembled, the second back panel layer 720a-d is positioned so as to extend past each side of the first back panel layer 710 by the first thickness 740.

The shipping crate 100 is then further assembled by assembling the plurality of walls 300a-d such that the first wall layer 310 of each of the walls forms a first post and lintel assembly and the second wall layer 320 of each of the plurality of walls forms a second post and lintel assembly.

The back panel 700 is then located such that the first back panel layer 710 rests on the sides 330 of the first wall layer 310 of each of the plurality of walls 300a-d and the second back panel layer rets on sides of the second wall layer 320 of the plurality of walls.

In some embodiments, after sizing the second wall layer 320 for each of the walls 300a-d, the first wall layer 310 is positioned relative to the second wall layer 320 using the jig 1900 shown in FIG. 19. As such, the wall layers are properly located while assembling the layers.

As discussed above, in some embodiments, prior to assembling the plurality of walls 300a-d, a bead of glue 600 is applied to each joint, and after assembling the plurality of walls, each joint is taped 610.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. A shipping crate comprising:
   a plurality of walls, each wall comprising at least two layers of rigid material,
   wherein a first wall layer of the at least two layers of each wall has sides and a first thickness; and
   wherein a second wall layer of the at least two layers of each wall has sides extending past each of the sides of the corresponding first wall by the first thickness, and
   a back panel comprising a first back panel layer of the rigid material and at least a partial second back panel layer of the rigid material,
   wherein the first back panel layer has sides and a thickness substantially similar to the first thickness; and
   wherein the second back panel layer extends past each of the sides of the first back panel layer by the first thickness, and
   a plurality of cleats, each comprising two panels of rigid material butted together at a joint,
   wherein, when assembled, the first wall layers of each of the plurality of walls combine to form a first post and lintel assembly and the second wall layers of each of the plurality of walls combine to form a second post and lintel assembly distinct from the first post and lintel assembly, and
   wherein, when assembled, each joint of two walls is overlayed with a corresponding cleat of the plurality of cleats, and
   wherein all of the plurality of walls have a substantially similar second wall layer width, and wherein each of the two panels of rigid materials forming the corresponding cleats have a substantially similar cleat panel length larger than the second wall layer width by twice the first thickness, such that when applied to the joints of two walls, a first end of each cleat panel extends past a first corresponding side of the underlying second wall layer by the first thickness and a second end of each cleat panel extends past a second corresponding side of the underlying second wall layer by the first thickness.

2. The shipping crate of claim 1, wherein the at least two layers of rigid material are bonded.

3. The shipping crate of claim 1, wherein the second back panel layer comprises a plurality of battens defining a border of the first back panel layer.

4. The shipping crate of claim 3, wherein the plurality of battens of the second back panel layer form a third post and lintel assembly.

5. The shipping crate of claim 1 wherein the rigid material is a solid non-corrugated board material.

6. The shipping crate of claim 1 wherein when assembled, the first back panel layer abuts the sides of the first wall layer of each of the plurality of walls, the second back panel layer rests on the sides of the second wall layer of each of the plurality of walls, and the first back panel layer is enclosed on all sides by the second wall layers of the plurality of walls.

7. The shipping crate of claim 1 further comprising frame battens rotatably fixed to the second wall layer opposite the back panel, such that when in a closed configuration, a first face of each of the frame battens rests on the sides of the second wall layer of each of the plurality of walls and a second face of each of the frame battens opposite the first face is flush with the second ends of each of the cleat panels.

8. The shipping crate of claim 7, wherein, when in the closed configuration, the frame battens form a fourth post and lintel assembly.

9. The shipping crate of claim 7 further comprising a lid panel, wherein the lid panel rests on the sides of the first wall layer such that when in the closed configuration, the first face of each of the frame battens rests on an outer face of the lid panel, and an outer edge portion of the lid panel is sandwiched between the first wall layer and the frame battens.

10. The shipping crate of claim 1, wherein for each cleat, the two panels of rigid material are butted together in a configuration matching the corresponding joint of two walls, such that each panel extends past the underlying second wall layer by the first thickness at the joint.

11. The shipping crate of claim 1 further comprising at least one handle fixed to an outer surface of at least one corresponding and abutting a corresponding eat.

12. The shipping crate of claim 1 wherein one of the plurality of walls is defined as a bottom panel, and wherein two skids are fixed to an outer surface of the bottom panel and each of the two skids abut a corresponding cleat.

13. The shipping crate of claim 1, wherein all joints are glued prior to assembly and taped after assembly.

14. The shipping crate of claim 1, wherein two of the plurality of walls are defined as side walls, one is defined as a top wall, and one is defined as a bottom wall, and wherein the two first wall layers and the second wall layers of the side walls are the posts of the first and second post and lintel assemblies respectively, and wherein the first and second wall layers of each of the top wall and the bottom wall are lintels for the corresponding assemblies.

15. The shipping crate of claim 14 wherein the second back panel layer comprises a plurality of battens arranged in a third post and lintel assembly defining a border of the first back panel layer, and wherein, when assembled, the battens adjacent the side walls are the posts of the third post and lintel assembly and the battens adjacent the top and bottom walls are the lintels for the corresponding assemblies, and
wherein the shipping crate further comprises frame battens rotatably fixed to the second wall layer opposite the back panel, such that when in a closed configuration, a first face of each of the frame battens rests on the sides of the second wall layer of each of the plurality of walls and form a fourth post and lintel assembly, and wherein the frame battens adjacent the side walls are the posts of the fourth post and lintel assembly and wherein the frame battens adjacent the top and bottom walls are the lintels for the corresponding assemblies.

16. A shipping crate comprising:
a plurality of walls, each wall comprising at least two layers of rigid material,
wherein a first wall layer of the at least two layers of each wall has sides and a first thickness; and
wherein a second wall layer of the at least two layers of each wall has sides extending past each of the sides of the corresponding first wall by the first thickness, and
a back panel comprising a first back panel layer of the rigid material and at least a partial second back panel layer of the rigid material,
wherein the first back panel layer has sides and a thickness substantially similar to the first thickness; and
wherein the at least partial second back panel layer extends past each of the sides of the first back panel layer by the first thickness,
wherein, when assembled, the first wall layers of each of the plurality of walls combine to form a first post and lintel assembly and the second wall layers of each of the plurality of walls combine to form a second post and lintel assembly distinct from the first post and lintel assembly,
wherein two of the plurality of walls are defined as side walls, one is defined as a top wall, and one is defined as a bottom wall, and wherein the two first wall layers and the second wall layers of the side walls are the posts of the first and second post and lintel assemblies respectively, and wherein the first and second wall layers of each of the top wall and the bottom wall are lintels for the corresponding assemblies,
wherein the at least partial second back panel layer comprises a plurality of battens arranged in a third post and lintel assembly defining a border of the first back panel layer, and wherein, when assembled, the battens adjacent the side walls are the posts of the third post and lintel assembly and the battens adjacent the top and bottom walls are the lintels for the corresponding assemblies, and
wherein the shipping crate further comprises frame battens rotatably fixed to the second wall layer opposite the back panel, such that when in a closed configuration, a first face of each of the frame battens rests on the sides of the second wall layer of each of the plurality of walls and form a fourth post and lintel assembly, and wherein the frame battens adjacent the side walls are the posts of the fourth post and lintel assembly and wherein the frame battens adjacent the top and bottom walls are the lintels for the corresponding assemblies.

* * * * *